(12) United States Patent
Tramm et al.

(10) Patent No.: US 10,479,563 B2
(45) Date of Patent: Nov. 19, 2019

(54) UTILITY ANTI-THEFT ENCLOSURE

(71) Applicant: Hubbell Incorporated, Shelton, CT (US)

(72) Inventors: Paul Steven Tramm, Knoxville, TN (US); John Thomas Polk, Townsend, TN (US); Greg Glenn Isaacson, Fallbrook, CA (US)

(73) Assignee: Hubbell Incorporated, Shelton, CT (US)

( * ) Notice: Subject to any disclaimer, the term of this patent is extended or adjusted under 35 U.S.C. 154(b) by 821 days.

(21) Appl. No.: 15/152,000

(22) Filed: May 11, 2016

(65) Prior Publication Data

US 2016/0336728 A1  Nov. 17, 2016

Related U.S. Application Data

(60) Provisional application No. 62/159,443, filed on May 11, 2015.

(51) Int. Cl.
| | |
|---|---|
| *B65D 55/02* | (2006.01) |
| *B65D 43/02* | (2006.01) |
| *E05B 65/00* | (2006.01) |
| *H02G 9/10* | (2006.01) |

(52) U.S. Cl.
CPC ............ *B65D 43/02* (2013.01); *E05B 65/006* (2013.01); *E05B 65/0089* (2013.01); *H02G 9/10* (2013.01)

(58) Field of Classification Search
CPC ....... B65D 43/02; B65D 55/02; E05B 65/006; E05B 65/0089
USPC ........................................................ 220/3.8
See application file for complete search history.

(56) References Cited

U.S. PATENT DOCUMENTS

| | | | |
|---|---|---|---|
| 3,508,363 A | 4/1970 | Crivello et al. | |
| 4,365,108 A | 12/1982 | Bright | |
| 5,197,307 A * | 3/1993 | Abbott, Jr. ............ | E05B 65/006 52/220.1 |
| 7,030,315 B1 | 4/2006 | Dunn et al. | |
| 7,347,070 B1 | 3/2008 | Spector | |
| 7,381,888 B2 | 6/2008 | Burke et al. | |
| 7,683,256 B1 | 3/2010 | Chumacero | |
| 7,807,923 B2 | 8/2010 | Moran | |
| 7,884,283 B1 | 2/2011 | Ousley | |
| 7,922,033 B2 | 4/2011 | Kearby et al. | |
| 7,975,515 B2 * | 7/2011 | Ygnelzi ................ | E05B 13/001 109/52 |
| 8,302,796 B1 | 11/2012 | Johnson | |
| 8,347,670 B2 | 1/2013 | Rix | |
| 8,835,757 B2 | 9/2014 | Freeman | |

(Continued)

FOREIGN PATENT DOCUMENTS

| | | |
|---|---|---|
| DE | 102007031843 | 1/2009 |
| FR | 2453241 | 10/1980 |

OTHER PUBLICATIONS

PCTUS2016/031800 International Search Report and Written Opinion dated Aug. 16, 2016.

*Primary Examiner* — King M Chu
(74) *Attorney, Agent, or Firm* — Michael Best & Friedrich, LLP

(57) ABSTRACT

A utility enclosure includes a box having a plurality of walls and a central opening. An insert is positioned in the central opening and includes a plurality of connected side walls. A removable cover is connected to the insert. A removable lid is connected to the box.

17 Claims, 4 Drawing Sheets

(56) References Cited

U.S. PATENT DOCUMENTS

| | | |
|---|---|---|
| 2005/0000175 A1 | 1/2005 | Machledt et al. |
| 2006/0021403 A1 | 2/2006 | Kuo |
| 2009/0057316 A1 | 3/2009 | Schweinberg et al. |
| 2009/0200056 A1 | 8/2009 | Moran |
| 2009/0249843 A1 | 10/2009 | Ygnelzi et al. |
| 2011/0290802 A1* | 12/2011 | Burros .................. H02G 3/081 220/327 |
| 2012/0111666 A1 | 5/2012 | Freeman |
| 2012/0228302 A1* | 9/2012 | Byrns ..................... H02G 9/10 220/484 |
| 2013/0024853 A1 | 9/2013 | Dang |
| 2014/0000328 A1 | 1/2014 | Madruga et al. |
| 2014/0083146 A1* | 3/2014 | Ousley .................... H02G 9/10 70/158 |
| 2015/0263502 A1 | 9/2015 | Tipton et al. |

\* cited by examiner

UTILITY ANTI-THEFT ENCLOSURE

RELATED APPLICATIONS

This application is based on U.S. provisional application Ser. No. 62/159,443, filed May 11, 2015, the disclosure of which is incorporated herein by reference in its entirety and to which priority is claimed. This application is related to U.S. patent application Ser. No. 14/645,676, filed Mar. 12, 2015, the disclosure of which is incorporated by reference in its entirety.

FIELD

The invention relates generally to the field of utility enclosures, and more particularly to anti-theft devices for in-ground utility boxes.

BACKGROUND

Utility enclosures are located throughout residential and commercial areas to provide housing and access to utility lines, such as electrical, communication, cable, phone, water, or gas lines or other components used in utility transmissions. Areas around connection points, taps, splices, or other utility junctions are typically provided with an enclosure. Enclosures can be positioned above ground, buried underground, or any combination thereof. The space inside the enclosure can protect the utility line and allow access and room for service or maintenance at the enclosures location.

Enclosures are provided with removable covers, panels or other forms of openings to provide access to the interior. Theft, vandalism, and tampering are common problems with utility lines and enclosures. In certain instances, therefore, it is desirable to prevent or deter unwanted access to the interior of such enclosures.

SUMMARY

According to an exemplary embodiment, a utility enclosure includes a box including a plurality of walls and a central opening for receiving a utility component. An insert having a plurality of insert side walls is configured to be positioned in the central opening. A removable cover having a top and a cover wall extending from the top is configured to be placed over the insert so that the cover wall surrounds at least a portion of the plurality of insert side walls. A removable lid is configured to connect to the box.

According to another exemplary embodiment, a utility enclosure includes an insert having a plurality of insert side walls configured to be positioned around an underground utility component. A removable cover has a top and a cover wall extending from the top. The cover is configured to be placed over the insert so that the cover wall surrounds at least a portion of the plurality of insert side walls. A locking interface extends from the top of the cover having a lock chamber and a key access chamber.

According to another exemplary embodiment, a utility enclosure includes a box having a plurality of walls and a central opening for receiving a utility component. An insert is configured to be positioned in the central opening around the utility component. The insert includes a plurality of insert side walls and a flange extending from the side walls and configured to extend under at least one of the plurality of box walls. A removable cover is configured to be placed over the insert. A locking interface extends from the top of the cover having a base and a plurality of side walls defining a lock chamber and a key access chamber. A removable lid is configured to connect to the box.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

Figure 1:
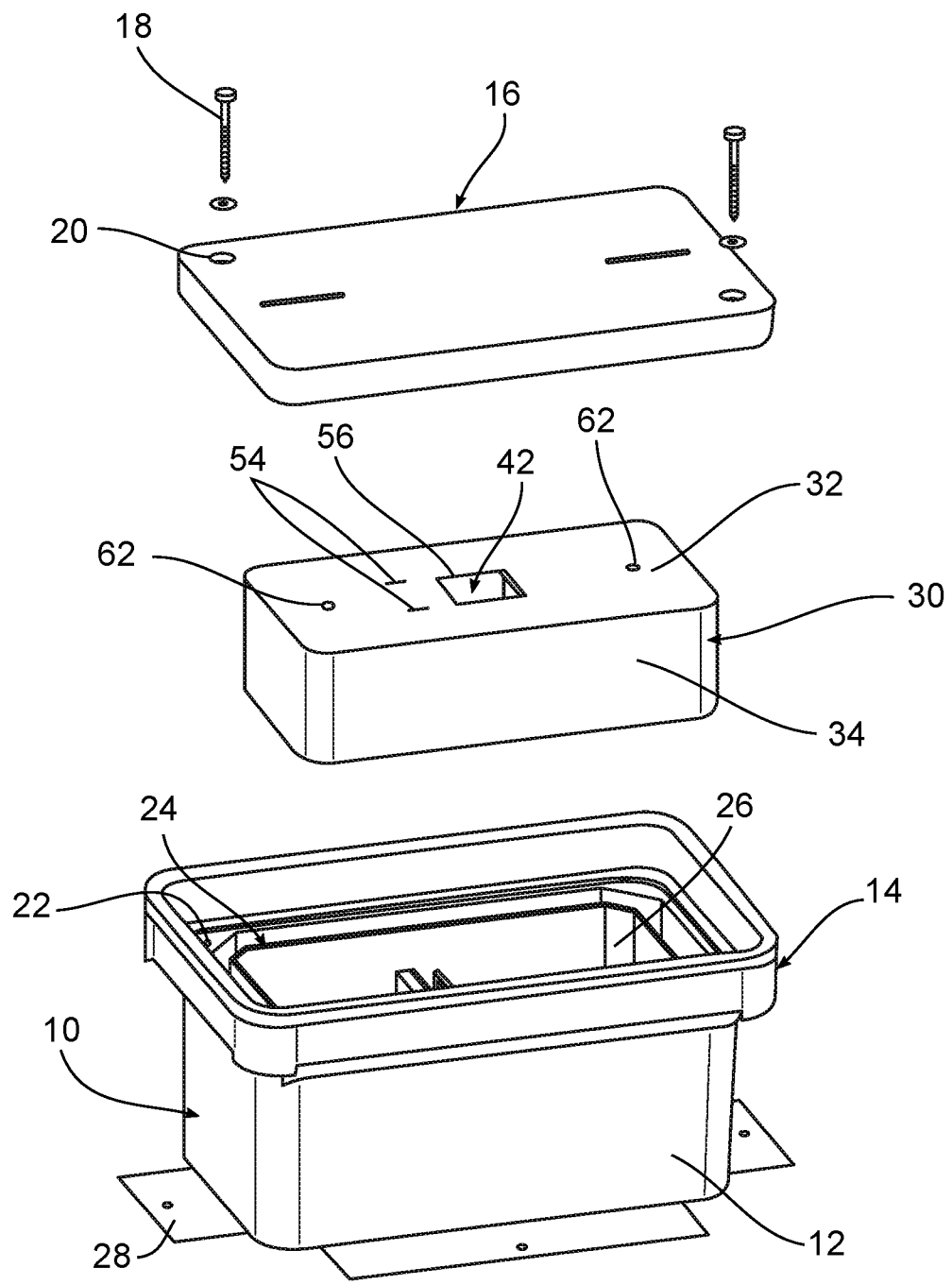
FIG. 1 is a perspective view of an exemplary box, lid, insert and cover.
Figure 2:
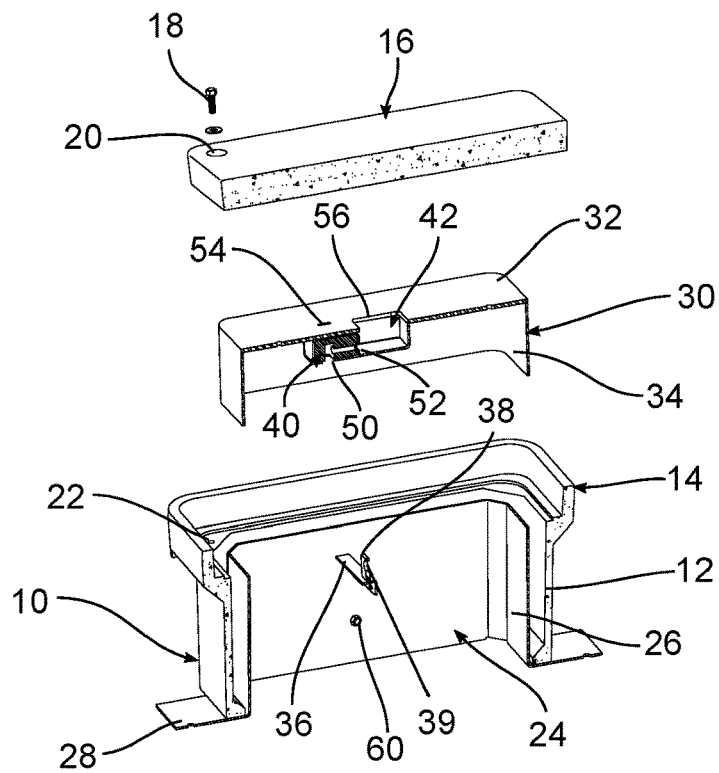
FIG. 2 is a sectional view of FIG. 1 taken through a midpoint of the components.

FIG. 1 shows an exemplary embodiment of a box 10 having a plurality of connected walls 12 surrounding a central opening and a rim 14 extending from the walls 12. A lid 16 is connected to the box 10, for example with one or more fasteners 18. A pair of lid openings 20 align with a pair of box openings 22 to receive the fasteners 18 and secure the lid 16 to the box 10. The box 10 and the lid 16 can be made from a polymer concrete or other suitable material such as concrete, polymer, or metal. The fasteners 18 can be hex-head bolts, tamper resistant bolts, or other fasteners. As would be understood by one or ordinary skill in the art, the box 10 can be configured to receive a utility components and connections, for example electrical, communication, cable, phone, water, or gas lines or other components used in utility transmissions.

As best shown in FIGS. 1-4, an insert 24 is positioned in the central opening. The insert 24 has a plurality of side walls 26 surrounding a central region. As shown, eight walls 26 are used in an octagonal configuration to maximize the internal volume. In various exemplary embodiments, any number or combination of rectilinear or curvilinear sides may be used, including a single circular or oval side. One or more flanges 28 extend from one or more side walls 26 away from the central region and are configured to extend at least partially under the walls 12 of the box 10. The exemplary embodiment shows four flanges 28, although any number of flanges 28 may be used, including a single discrete flange or a single continuous flange. In an exemplary embodiment the insert 24 is made from metal, for example steel, although other suitable materials can be used.

A cover 30 is connected to the top of the insert 24. The cover 30 includes a top wall 32 and one or more side walls 34 extending from the top wall 32. When the cover 30 is placed on or over the insert 24 the side walls 34 are long enough to extend over at least a portion of the insert side walls 26. In an exemplary embodiment, the cover 30 is configured to limit access to the interior of the insert and prevent or limit the ability to pry the cover 30 from the insert 24. For example, the cover side walls 34 can be adjacent and/or touching the insert side walls 26. The cover side walls 34 can also extend over the insert 24 down into the box 10 a sufficient depth so that a person would not be able to position a tool to attempt to pry the cover 30 from the insert 24. In some embodiments, the cover 30 extends at least approximately 3 inches below an upper edge of the insert side walls 26. In some embodiments the cover 30 extends at least approximately 5 inches below an upper edge of the insert side walls 26. In various exemplary embodiments, the cover 30 can extend in the range of approximately 3 inches below an upper edge of the insert side walls 26 to approximately the bottom of the insert side walls 26.

The cover 30 and the insert 24 are connected through a locking interface. In an exemplary embodiment, the locking interface includes a crossbar 36 that extends across the insert 24 and a lock tab 38 extending upward from the crossbar 36. The lock tab 38 includes an opening 39 to receive the shackle of a lock.

Figure 4:
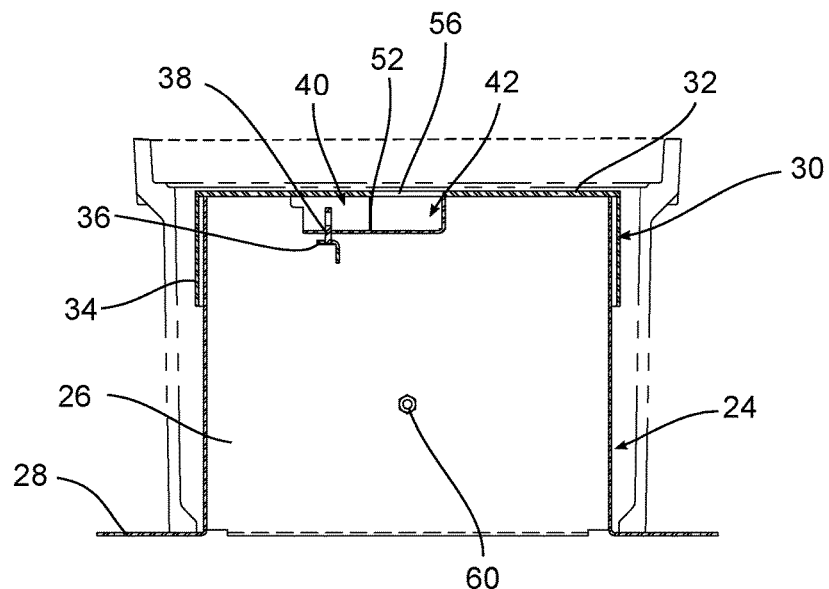
FIG. 4 is a side, sectional view of an assembled insert and cover with a box and lid shown in phantom lines.
Figure 5:
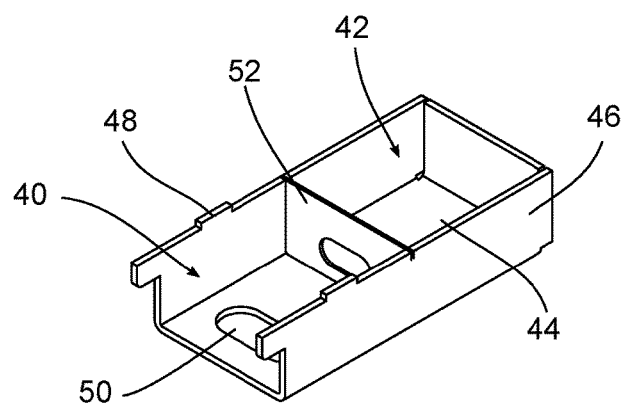
FIG. 5 is a perspective view of an exemplary lock chamber, key chamber, and partition assembly.
Figure 6:
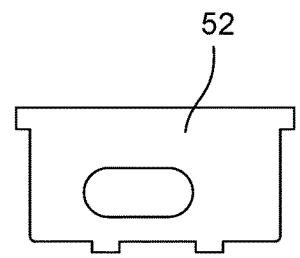
FIG. 6 is a front view of the partition of FIG. 5.
Figure 7:
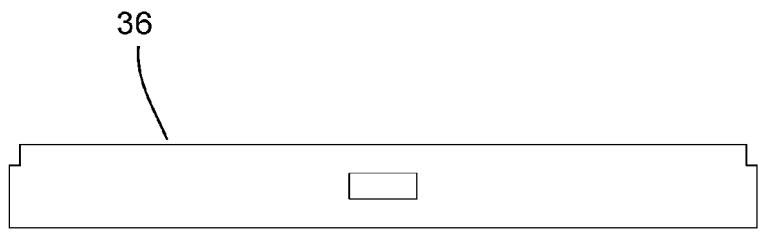
FIG. 7 is a top view of an exemplary crossbar.
Figure 8:
FIG. 8 is a right side view of FIG. 7.
Figure 9:
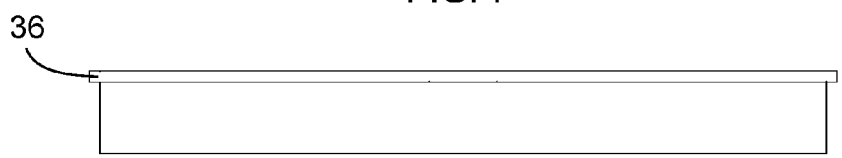
FIG. 9 is a front view of FIG. 7.
Figure 10:
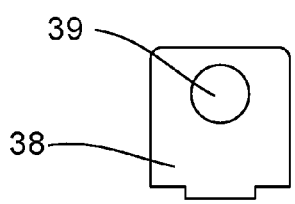
FIG. 10 is a front view of an exemplary lock tab.
Figure 11:
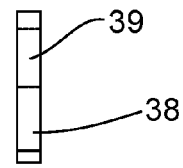
FIG. 11 is a right side view of FIG. 10.
Figure 12:
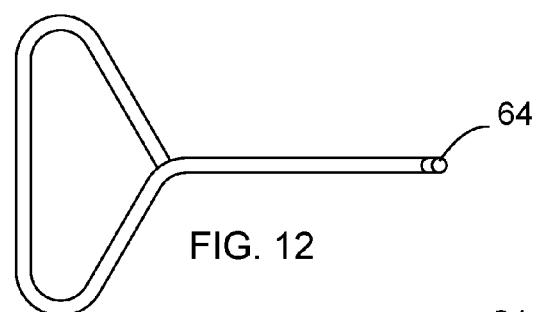
FIG. 12 is a bottom view of an exemplary lifting tool.
Figure 13:
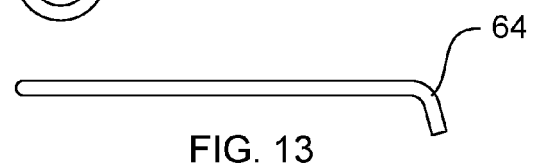
FIG. 13 is a right side view of FIG. 12.

In an exemplary embodiment a lock chamber 40 and a key access chamber 42 extend from the bottom surface of the cover 30. As best shown in FIGS. 4 and 5, the lock chamber 40 and the key access chamber 42 are formed by a base 44 and one or more side walls 46. A pair of tabs 48 can extend from the side walls 46, for example adjacent the lock chamber 40. The bottom of the lock chamber 40 can include a slot 50. The lock chamber 40 and the key access chamber 42 are separated by a partition 52 having an aperture. The partition 52 can be placed in grooves formed in the side walls 46. In an exemplary embodiment, the lock chamber 40 and the key access chamber 42 are formed as a single unitary or monolithic structure with the partition 52 separately attached. In some embodiments, the lock chamber 40 and key access chamber 42 can be separated from one another or also formed of discrete parts connected together.

Figure 3:
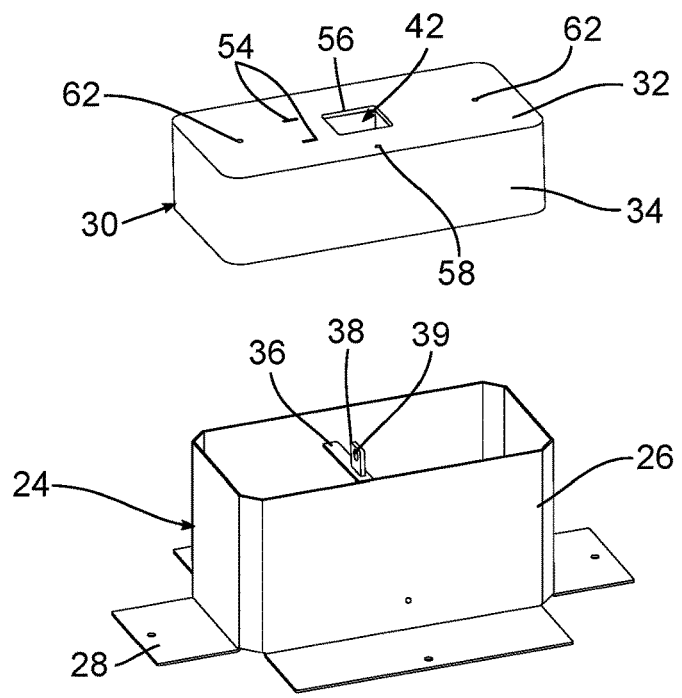
FIG. 3 is a perspective view of the insert and cover of FIG. 1.

As shown in the exemplary of FIG. 3, the cover 30 can include a first pair of slots 54 and an opening 56. The slots 54 receive the tabs 48 from the side wall 46 adjacent the lock chamber 40. The opening 56 provides access to the key access chamber 42. In an exemplary embodiment, the lock and key access chambers 40, 42 can be welded to the cover, although other connections can be used.

The lock chamber 40 has an open first end to receive a lock, for example a disc-shaped lock. The top of the lock chamber 40 is covered by the bottom surface of the cover 30 to form a hidden chamber, preventing unauthorized access to the lock. When the lock is positioned in the lock chamber 40, the key receiving portion of the lock extends through or is accessible through the partition 52 and the key access chamber 42. The slot 50 in the bottom of the lock chamber 40 aligns with the path of the disc-lock shackle. When the cover 30 is placed on the insert 24, the lock tab 38 is received in the slot 52 so that closure of the lock inserts the lock shackle through the opening 39 in the lock tab 38, securing the cover 30 to the insert 24.

In an exemplary embodiment, the cover 30 includes a first grounding feature 58. The grounding feature 58 can include an opening that receives a fastener to connect to a grounding conductor. The insert 24 can also include a grounding feature 60, for example an opening and a fastener to connect to a grounding conductor.

In an exemplary embodiment the cover 30 includes one or more lifting openings 62 that receive a lifting device 64. A pair of lifting openings 62 can be used with a pair of lifting devices 64 to allow one or more users to pull the cover 30 from the insert 24. The lifting openings 62 are optional and various embodiments can utilize no lifting openings 62, one lifting opening 62, or more than two lifting openings 62. The size, shape, and configuration of the lifting openings 62 can also be varied based on the application and the configuration of the cover 30 and the lifting tool 64.

The illustrated exemplary embodiment shows a box 10 having a recessed lid 16 that rests on an upper surface of the rim 14 so that the top of the lid 16 is substantially flush with the top of the rim 14 and at grade level. As would be understood by one of ordinary skill in the art, different types of lids, including T-top lids, two piece lids, and flat lids. Even though the illustrated exemplary embodiment shows a straight wall box 10, one of ordinary skill in the art would understand that different types of boxes 10, including tapered or flared walls, corrugated or ribbed walls, round enclosures or other types of above and below ground enclosures can be used. One or ordinary skill in the art would also understand that the size, shape, and configuration of the insert 24 and cover 30 can be modified to accommodate the different box 10 and lid 16 combinations discussed herein.

The foregoing detailed description of the certain exemplary embodiments has been provided for the purpose of explaining the principles of the application and examples of practical implementation, thereby enabling others skilled in the art to understand the disclosure for various embodiments and with various modifications as are suited to the particular use contemplated. This description is not necessarily intended to be exhaustive or to limit the application to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present application, and are not intended to limit the structure of the exemplary embodiments to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A utility enclosure comprising:
   a box including a plurality of walls and a central opening for receiving a utility component;
   an insert having a plurality of insert side walls and configured to be positioned in the central opening and a continuous flange extending around the plurality of insert side walls and configured to extend underneath at least one of the walls of the box;
   a removable cover having a top and a cover wall extending from the top, the cover configured to be placed over the insert so that the cover wall surrounds at least a portion of the plurality of insert side walls; and
   a removable lid configured to connect to the box.

2. The utility enclosure of claim 1, wherein four separate flanges extend from four insert side walls.

3. The utility enclosure of claim 1, wherein a locking interface connects the cover to the insert.

4. The utility enclosure of claim 1, wherein the cover is configured to prevent a tool from prying the cover from the insert.

5. A utility enclosure comprising:
an insert having a plurality of insert side walls and configured to be positioned around a utility component;
a removable cover having a top and a cover wall extending from the top, the cover configured to be placed over the insert so that the cover wall surrounds at least a portion of the plurality of insert side walls; and
a locking interface extending from the top of the cover having a lock chamber and a key access chamber,
wherein the lock chamber and the key access chamber are defined by a base and a plurality of walls.

6. The utility enclosure of claim 5, wherein a tab extends from one of the plurality of walls and the cover includes a slot for receiving the tab.

7. The utility enclosure of claim 5, wherein the locking interface includes a crossbar extending from one of the insert side walls and a lock tab extending from the crossbar having an opening.

8. The utility enclosure of claim 7, wherein the crossbar extends from a first insert side wall to a second insert side wall.

9. The utility enclosure of claim 5, wherein the lock chamber includes a slot to receive the lock tab and a shackle of the lock passes through the opening of the lock tab when in the locked position.

10. The utility enclosure of claim 7, wherein the key access chamber is separated from the lock chamber by a partition.

11. The utility enclosure of claim 10, wherein one of the walls includes a slot for receiving a portion of the partition.

12. A utility enclosure comprising:
a box including a plurality of walls and a central opening for receiving a utility component;
an insert configured to be positioned in the central opening around the utility component, the insert including a plurality of insert side walls and a flange extending from the side walls and configured to extend under at least one of the plurality of box walls;
a removable cover configured to be placed over the insert;
a locking interface extending from the top of the cover having a base and a plurality of side walls defining a lock chamber and a key access chamber and
a removable lid configured to connect to the box.

13. The utility enclosure of claim 12, wherein the cover includes a grounding feature.

14. The utility enclosure of claim 12, wherein the insert includes a grounding feature.

15. The utility enclosure of claim 12, wherein the cover includes a lifting opening.

16. The utility enclosure of claim 12, wherein the cover includes a top and a cover wall extending from the top, the cover configured to be placed over the insert so that the cover wall surrounds at least a portion of the plurality of insert side walls.

17. The utility enclosure of claim 12, wherein the key access chamber is separated from the lock chamber by a partition.

* * * * *